(12) United States Patent
Kellinger et al.

(10) Patent No.: US 10,138,875 B2
(45) Date of Patent: Nov. 27, 2018

(54) GRAVITY FIELD ENERGY STORAGE AND RECOVERY SYSTEM

(71) Applicants: James Francis Kellinger, Cliffside Park, NJ (US); Michael Thane MacKay, Port Saint Lucie, FL (US)

(72) Inventors: James Francis Kellinger, Cliffside Park, NJ (US); Michael Thane MacKay, Port Saint Lucie, FL (US)

( * ) Notice: Subject to any disclaimer, the term of this patent is extended or adjusted under 35 U.S.C. 154(b) by 426 days.

(21) Appl. No.: 14/490,630

(22) Filed: Sep. 18, 2014

(65) Prior Publication Data

US 2016/0084236 A1    Mar. 24, 2016

(51) Int. Cl.
*F03G 3/00* (2006.01)

(52) U.S. Cl.
CPC ..................... *F03G 3/00* (2013.01)

(58) Field of Classification Search
CPC ... F03B 17/00–17/04; F03G 3/00–3/08; F03G 7/00; F03G 7/08; F03G 7/10

USPC ................................................ 60/495–507
See application file for complete search history.

(56) References Cited

U.S. PATENT DOCUMENTS

| | | | |
|---|---|---|---|
| 2012/0112472 A1* | 5/2012 | Murray | H02J 15/003 290/1 R |
| 2012/0280515 A1* | 11/2012 | Huang | F03B 13/06 290/1 C |
| 2014/0047826 A1* | 2/2014 | Bollinger | H02J 15/006 60/327 |

* cited by examiner

*Primary Examiner* — Mark Laurenzi
*Assistant Examiner* — Mickey France

(57) ABSTRACT

Device for storing energy using a physical object, such as a mass of greater than 10,000 kg, or buoyant object, floating in fluid, capable of displacing 10,000 kg. A mass is repositioned to greater altitude in a gravitational field to a position of higher potential energy. A buoyant object is forcibly submerged into a fluid, displacing greater than 10,000 kg of fluid, to a position of higher potential energy. The stored potential energy may be recovered with extremely low loss regardless of the state of charge of the system, or length of time of the storage.

1 Claim, 4 Drawing Sheets

GRAVITY FIELD ENERGY STORAGE AND RECOVERY SYSTEM

BACKGROUND OF THE INVENTION

Field of the Invention

Significant advances have been made in alternative energy systems as society seeks to ameliorate the deleterious effects inherent in legacy energy systems. Fossil fuel systems rely on the combustion of hydrocarbons such as ethane, n-pentane, methane, n-octane, and coal, which, under perfect conditions, will produce heat and kinetic energy and the by-products of water and carbon dioxide. As an example, the combustion of methane in the presence of air is stoichiometric as $$CH_4 + 2(O_2 + 3.76N_2) \rightarrow CO_2 + 2H_2O + 7.52N_2$$

An array of hydrocarbons that are the constituents of gasoline (a well-known example is n-octane), as well as the hydrocarbons associated with coal and fuel oil, all burn in a similar fashion. Automobile engines rely on the Carnot cycle and gas turbines, powering jet aircraft and marine propulsion, rely on the Brayton cycle to harness, through a mechanical arrangement, the rapid gas expansion of the burning fuel to develop continuous shaft horsepower.

Commercial electric power is produced when coal or fuel oil is burned to boil water, the steam being used to turn a turbine as per the Rankine cycle, producing a continuous shaft horsepower. Nuclear electric power generation utilizes a controlled nuclear fission of uranium and it's byproducts as a heat source to boil water, and similarly, develops a continuous shaft horsepower from a steam turbine. In both cases, the continuous shaft horsepower is used to rotate an electric generator.

The problems associated with our legacy systems dominate our technological, economic, strategic, scientific, and geopolitical landscapes. An energy hungry world seeks to control the world's precious hydrocarbon resources resulting in "blood for oil" military conflicts which themselves carry a risk of escalation to a global scope, raising the terrible specter of exchanged nuclear strikes between states equipped with atomic weapons.

According to the National Science and Technology Council (NSTC) the use of hydrocarbons as a fuel, even under perfect conditions, emits carbon dioxide as a byproduct, which as a "greenhouse gas" is implicated in global warming;' Rarely are the conditions perfect however, and the burning of hydrocarbon emits many unfortunate byproducts which otherwise pollute the air, causing serious human health problems.

According to the US Department of Energy nuclear electric power generation has the advantage that it emits no greenhouse gases. There are, however, a number of thorny problems associated with nuclear power. The mining, refining, and processing of uranium ore into a useable material, is an environmentally costly process with associated health risks.[2] The operation of nuclear power stations is not foolproof as the disasters at Three Mile Island, Chernobyl, and Fukushima, demonstrate. The operation of nuclear power reactors produces a plethora of fission products associated with the spent nuclear fuel. Nuclear waste disposal involves the processing, transportation, and storage of these fission products. This presents an ongoing national problem involving challenging technological, scientific, strategic, and political issues. Moreover, spent nuclear fuel presents a security risk, as the proliferation of fissile materials can present opportunities to "rogue states" to obtain weapons grade nuclear materials.

The development and deployment of alternative energy systems beyond the legacy systems has the potential to alleviate many of the above problems. Light energy from the Sun striking the Earth is a far greater potential source of energy than all of the world's proven oil reserves. But new challenges arise due to the nature of the alternative systems.

Many of the alternative energy systems are not continuous systems but are time-varying as they only generate power when the alternative energy source is available. Solar powered photovoltaic cells produce appreciable power only when sufficient sunshine is available. Wind generators produce power only when the wind is blowing. Tidal water systems generate energy only when the water is moving, etc. This non-continuous, or periodic power harvesting technology requires massive energy storage systems to transform the periodic energy pulses to a quasi-continuous system to meet society's demand.

Description of Related Art

Each of the periodic alternative energy systems rely on an energy storage system to capture the excess energy and deliver it when required. A typical alternative energy system will generate electrical energy. Solar photovoltaic cells, wind generators, tidal and wave generators will use batteries and a battery charging system to store excess electrical energy. When required, the batteries will be switched from charging mode into discharging mode to apply the stored electrical energy. The delivered electrical energy is in the form of Direct Current (DC) electrical energy and may require the use of DC to DC converters and DC to AC (Alternating Current) inverters to deliver the stored energy in a form that is directly usable.

These periodic alternative energy systems then, rely on the added complexity and expenses related to energy conversion and chemical battery storage technologies. Chemical Batteries suffer from low energy/power density, poor low-temperature performance, limited cycle life, intrinsic safety limitations, and high cost.

Au important consideration in any energy conversion technology is the efficiency of the system which describes the losses inherent in the conversion. Lead acid batteries are commonly used in small photo voltaic systems. Sandia National Laboratories studied lead acid battery efficiencies and found that efficiencies are as low as 50% if the battery is at a high rate of charge when charging begins. A Study of Lead-Acid Battery Efficiency Near Top-of-Charge and the Impact on PV System Design by John W. Stevens and Garth P. Corey. Also, partial charging is deleterious to the battery itself:

This result has important implications to operational PV systems. That is, if a battery is partially charged for several consecutive cycles (for example, the array is marginally sized and there is a series of less than full sun days in the winter) the useable battery capacity decreases each cycle, even though the same amount of energy has been presented to the battery each day. This is the result of battery inefficiencies, electrolyte stratification, and sulfate buildup during these partial charges.

Thus, time-varying alternative energy systems rely upon a storage technology which is inherently inefficient and problematical from an operational, financial, and design standpoint. What is required is an alternative energy storage system that does not require batteries. The Gravity Field Energy Storage & Recovery System Invention is designed to deliver this alternative solution.

SUMMARY OF THE INVENTION

The Gravity Field Energy Storage & Recovery System [GFESRS] invention is a mechanical, electrical and electronic system that has the ability to harness any electrical or mechanical power source and allow it to do work to configure a mechanical system into a state of high potential energy, using either a hi-mass object in a gravitational field or a large buoyant object submerged into a fluid.

The charging cycle consists of repositioning a massive object in a gravity field to a position of higher potential energy. The potential energy can be stored without loss for extended periods of time.

The potential energy stored in the invention can be recovered on demand. The energy recovery mode consists of releasing the massive object in the gravity field in a controlled fall, producing a kinetic energy which can then be transformed into a useable form of energy such as electricity, pneumatic, or hydraulic power.

The work done to elevate the mass in the gravitational field then, is manifested as potential energy. The potential energy is stored indefinitely as long as the mechanism is in working order. This energy storage technique will not lose any potential energy over time as many other energy storage systems will.

The mass suspended in a gravitational field is coupled to an apparatus that can convert the stored potential energy. To release the stored energy the locking mechanism is released and allows the force of gravity to deliver a controlled acceleration of the mass towards the center of gravity. As the mass is accelerated in the gravitational field, the energy conversion apparatus, converts the kinetic energy into a useful form, specifically, a rotating shaft, and ancillary mechanisms such as an electric generator driven by the rotating shaft.

The present invention works the same in the context of a fluid whether the fluid is gas or liquid. Typically, the mass is denser than the surrounding fluid and energy is recovered in a controlled fall. This is the case if the mass is in air or water. This method would also work in a vacuum. If the mass is less dense than the surrounding fluid, it would be buoyant and tend to "float." In such a case, mechanical energy can be stored by forcing the mass to submerge into the fluid. The energy can be recovered by allowing the mass to float, recovering the energy as the mass displaces upward. This would apply to a buoyant object in water, or a lighter than air vessel or dirigible. Forcing the dirigible toward the center of the earth would be to reposition it to a position of higher potential energy. This energy can be recovered in a "controlled float" as the tethered dirigible rises in the atmosphere. Forcing a buoyant object in water to submerge stores energy which can be recovered as the object is allowed to rise.

Thus, a buoyant object can be repositioned to a position of higher potential energy by forcing it to submerge into a fluid and can be used to store energy. The energy storage can be released on demand, producing a kinetic energy which can then be transformed into a useable form of energy such as electricity, pneumatic, or hydraulic power. Thus a massive object can be repositioned to a position of higher potential energy by raising its altitude and can be used to store energy. The energy storage can be released on demand, producing a kinetic energy which can then be transformed into a useable form of energy such as electricity, pneumatic, or hydraulic power.

DETAILED DESCRIPTION OF THE INVENTION

Figure 1:
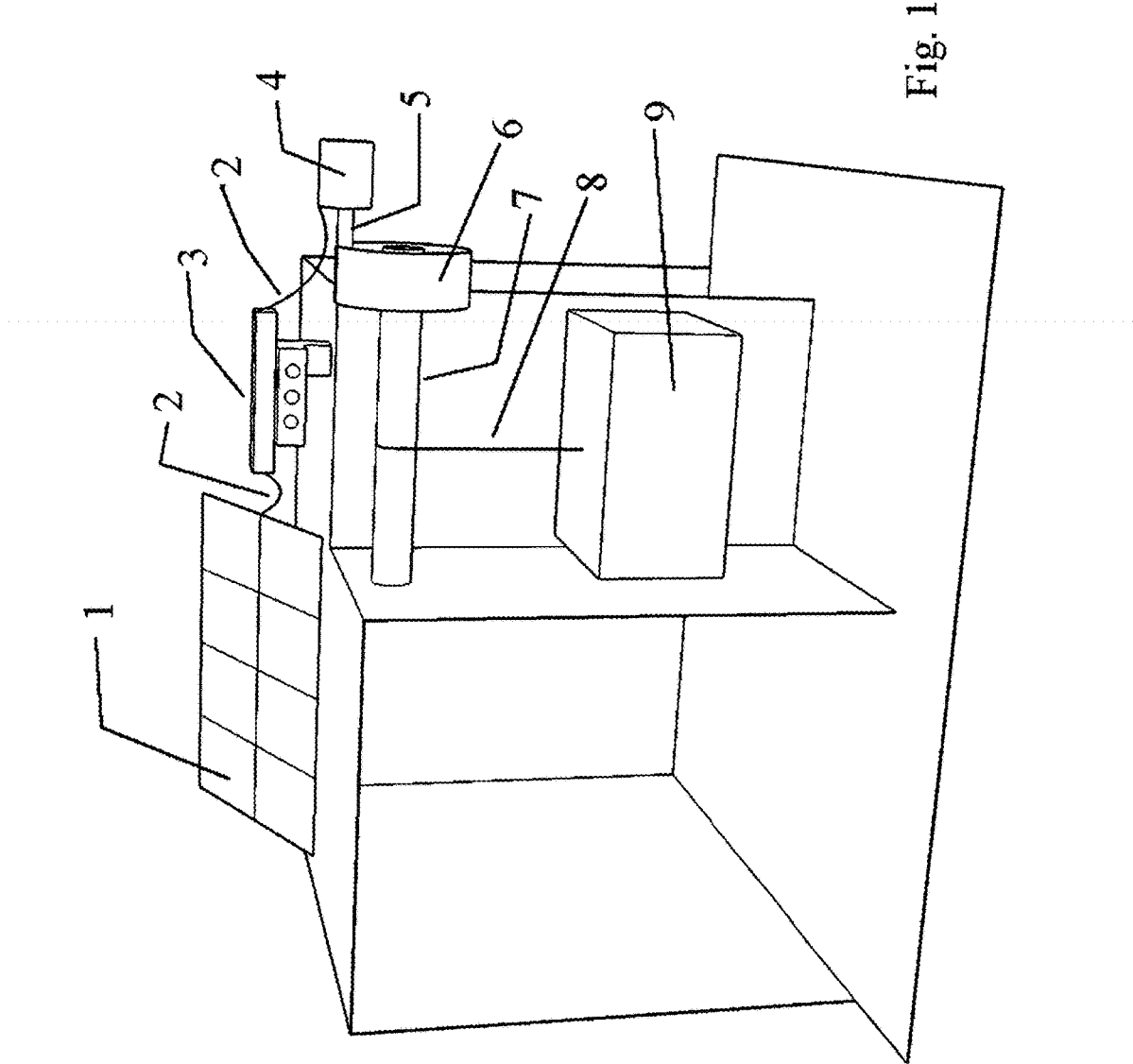
FIG. 1) Shows the invention using a solar array as the power source.

The Gravity Field Energy Storage & Recovery System [GFESRS] Invention is a mechanical, electrical and electronic system that can store energy from a variety of sources. The energy is directed at a mechanical/electrical device designed to raise a large massive object in a gravitational field, storing the energy as potential energy in the field.

The Force of Gravity is described as the mutual physical attraction which every particle in the universe has with every other particle in the universe. Newton discovered the universal law of gravitation in the year 1666 and described the force of gravity as $$F = \frac{GM_a M_b}{r^2}$$

Where $M_a$ and $M_b$ are the masses of two particles, r is the distance between the particles, and G is a constant of proportionality. The constant G was first measured by Cavendish in 1771 and the accepted value today is $$G = 6.67 \times 10^{-11} \text{ Nm}^2/\text{kg}^2$$

A large ensemble of particles such as a planet, acts as an aggregated single object with a mass equal to the sum of the masses of the particles, and the force of gravity directed at the center of mass of the ensemble. Thus, the force of gravity upon an object near the surface of the Earth is $$F = \frac{GM_e m}{r^2}$$

Where $M_e$ is the mass of Earth taken as $5.98 \times 10^{24}$ kg, m is the mass of an object infinitesimally less massive than earth, and r is the distance between their centers of mass. The force is direct toward the center of the earth.

The acceleration due to gravity is $$a = \frac{F}{m}$$
$$= \frac{GM_e}{r^2}$$
$$= \sim 9.8 \text{ m/s}^2 \text{ or } \sim 32 \text{ ft./s}^2$$

and interestingly, is independent of the mass of the object. This is the acceleration of gravity near the surface of the earth, which is usually denoted with a lower case italic g.

We calculate the change in g with increasing altitude, such $$g(r) = \frac{GM_e}{r_2}$$

-continued $$\Delta g(r) = \frac{dg}{dr}\Delta r$$
$$= -\frac{2GM_e}{r^3}\Delta r$$
$$= -\frac{2g}{r}\Delta r$$

$$\frac{\Delta g}{g} = -\frac{2\Delta r}{r}$$

and the fractional change is

At the earth's surface where $r=6\times 10^6$ m and so g increases one part per million for every increase in altitude of 3 meters. This insignificant change is very important in considering the present invention since the efficiency of the energy storage does not change in relation to the state of charge.

Aristotelian mechanics, which was accepted for thousands of years, believed that a force was necessary to maintain a body in uniform motion. Newton, through experimentation found rather, that a force acting upon a body accelerates the body according to his famous $2^{nd}$ Law
The law in one dimension
Can be integrated as $$F = \frac{d}{dt}Mv$$
$$F(x) = m\frac{dv}{dt}$$
$$m\int_{x_a}^{x_b}\frac{dv}{dt}dx = \int_{x_a}^{x_b}F(x)dx$$

And after a formal procedure we find that $$\tfrac{1}{2}mv_b^2 - \tfrac{1}{2}mv_a^2 = \int_{x_a}^{x_b}F(x)dx$$

where the term $\tfrac{1}{2}mv^2$ is known as the kinetic energy and the right hand side is called work as the particle moves and changes velocity from a to b.
In shorthand we say $$K_b - K_a = W_{ba}$$

This formula is known as The Work-Energy Theorem in one dimension.

In practice we see that a canon ball traveling at high velocity may hit the hull of a ship and its velocity reduces to zero. It is the change in velocity which imparts the energy and does work on the hull. We also see that the velocity the canon ball, instead of being supplied by the expanding gasses in the canon could be supplied by a drop from a vertical height. The canon ball dropped from rest at a given height h above the ground will deliver a kinetic energy to do work on the ground in proportion to its height above the ground. We can call this a potential energy which can be released at will. It will require work to elevate the canon ball to its prearranged height. As it turns out the potential energy is equal and opposite the kinetic energy. We say $$E = K + U$$

Where U denotes the potential energy of the system and E is the total mechanical energy of the system which is always constant since mechanical energy is conserved. Thus, as a mass at rest at a given height represents a potential energy, gravity will accelerate the mass and convert it to kinetic energy as the potential energy is reduced.

The Gravitational Energy Field Storage & Recovery System [GFESRS] Invention operates within the Earth's gravitational field. These gravitational fields can be naturally occurring on planets and related celestial bodies.

When we do work to separate masses that are gravitationally attracted to each other we create a form of potential energy. A mass at an altitude above the Earth's surface is a form of potential energy. This invention shows how to use this fact to store energy and then recover this stored energy on demand.

We harness energy from a variety of sources to perform the work of repositioning the mass in the gravitational field. These sources include any of the following: electric utility power grid, electric generator, solar, hydroelectric, geothermal, wind, ocean tidal, ocean current, ocean wave, ocean thermal, nuclear fission, nuclear fusion hydrogen fuel cell. It includes any energy source which converts a motion, such as an oscillating motion, to a rotational shaft motion. These sources may also included a tractive pulling force from a diesel tractor or diesel locomotive, or a direct lifting force from a heavy lift helicopter. This allows us to increase the potential energy in the system. Once energy is stored by the repositioning of the mass, we have the ability to recover the energy immediately or to store it indefinitely. Once stored, maintaining the stored energy requires no work, and, unlike battery systems, is lossless for an indefinite period of time. Unlike battery systems, energy storage can be implemented incrementally up to the storage limit of the system, and remains efficient regardless of the state of charge or history of the system.

The stored energy can be released and recovered by controlling the acceleration of the mass as the potential energy transforms into kinetic energy. This kinetic energy can be converted to a plurality of useful energy forms. These energy forms include electrical, pneumatic, hydraulic and other forms.

The energy storage phase can be repeated with an intermittent or continuous flow of energy until the GEFSRS reaches, it energy storage limits. The energy can be stored for an indefinite period of time without loss.

The stored energy can be recovered by controlling the fall of the mass to Earth. The conversion of the stored potential energy to kinetic energy constitutes the release cycle. This kinetic energy is harnessed to create a plurality of energy forms such as electrical, pneumatic, hydraulic power, or other forms of useful energy.

General System Configuration

Figure 2:
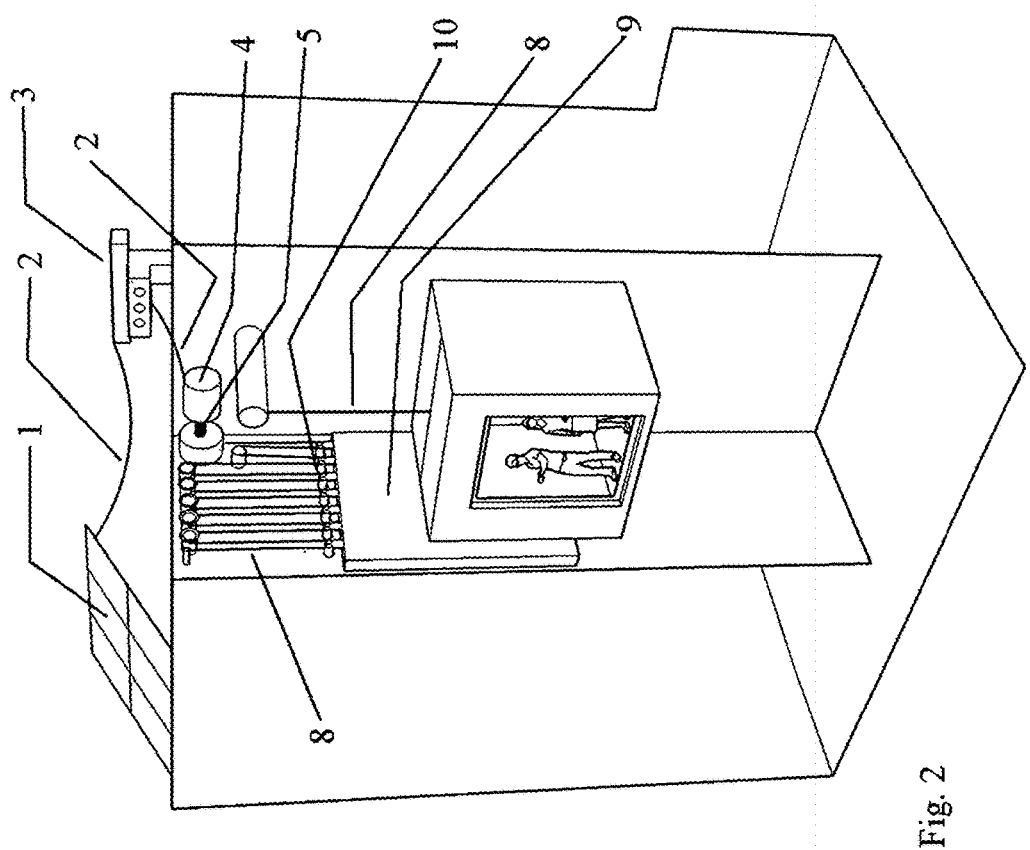
FIG. 2) Shows the invention as it could be installed in an elevator shaft in a high-rise building.
Figure 3:
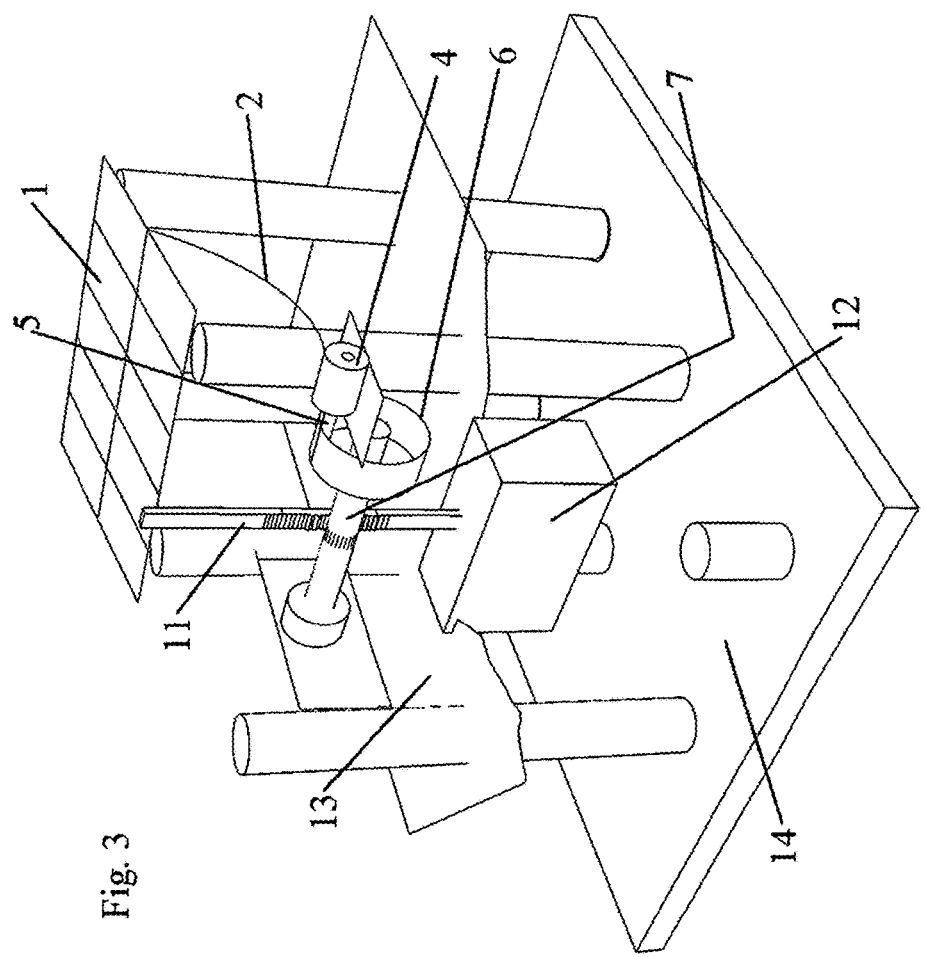
FIG. 3) Shows the invention as it could be installed on an offshore oil platform using a buoyant object.
Figure 4:
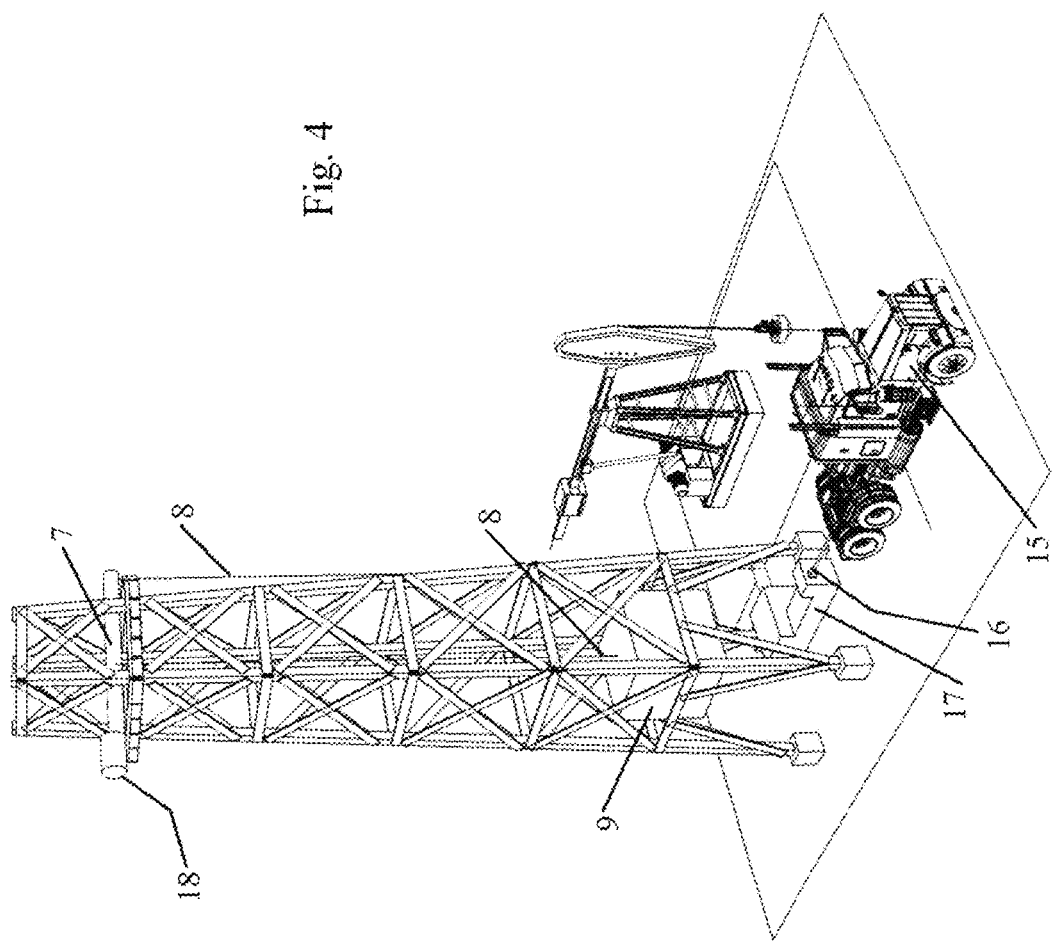
FIG. 4) Shows the invention as it could be installed in an oil field using a diesel tractor with power takeoff shaft as energy source.

In the embodiment of the Elevator Shaft Example [ESE] we refer to the system depicted in FIG. 2. ESE shows photovoltaic solar panels to represent a plurality of energy sources such as:

1. electromechanical
2. geothermal
3. wind
4. ocean tidal
5. ocean current
6. ocean wave
7. ocean thermal
8. nuclear fission
9. nuclear fusion
10. solar
11. chemical reactions
12. pneumatic
13. hydraulic
14. mechanical
15. others One or more of these forms of energy will be employed to drive the mass repositioning in the energy storage cycle. In the ESE example solar energy is used to drive an electrical motor which turns a shaft. The shaft rotation is applied to the energy conversion apparatus.

The Energy Conversion Apparatus [ECA] in the input of the ESE example is a gear box.

The electrical energy selected is converted to mechanical energy by the use of an electrical motor. The size of this motor is appropriate it to drive the ECA. The ECA drives the main shaft. The main shaft is connected to the mass. The described apparatus repositions the mass in the elevator shaft to the upper limit in the elevator shaft.

In any desired position the massive object can be locked in position. By locking the position of the massive object no energy is required or lost during the storage cycle regardless of duration.

The GEFSRS system delivers the proper mechanical load to allow the controlled falling of the massive object The main shaft rotation drives the Energy Conversion Apparatus [ECA The ECA at the output side of the ESE is a block and tackle. The rotation of the generator in recovery mode generates electricity.

This energy release cycle and conversion process delivers electrical power to drive a load until the massive object has reached is resting state at the bottom of the elevator shaft. FIGS. 1-4

1) SOLAR ARRAY: Delivers electric energy to the building. Alternative electrical energy sources may include but are not limited to; hydroelectric, wind, ocean tidal, ocean current, or local power grid.
2) ELECTRICAL AND ELECTRONIC INTERCONNECT: Interconnect from Solar Array 1 to System Electronics Control Unit 3. Provides energy transfer to the storage system and contains electronic sensor signal paths including contact closures and sensor data delivering information, commands, and signals, to operate any and all components of the system.
3) SYSTEM ELECTRONICS CONTROL UNIT: Manages the electrical energy from the plurality of sources which may be used at different times of day or night, characterized by parameters such as load characteristics and weather.
4) ELECTRIC MOTOR/GENERATOR: An electric motor with reconfigurable armature windings may be used as both motor and generator. In motor mode it is used to reposition the mass in the gravitational field in the energy storage cycle. In generator mode it is used to recover energy as the mass is released in a controlled acceleration. The output of the Electric Motor/Generator will connect to the System Electronics Control Unit 3 via Electrical and Electronics Interconnect 3.
5) ELECTRIC MOTOR/GENERATOR SHAFT: Electric Motor/Generator Shaft couples Electric Motor/Generator 4 to Energy Conversion Apparatus 6.
6) ENERGY CONVERSION APPARATUS: The Energy Conversion Apparatus (transmission) couples the Electric Motor/Generator Shaft 5 to the Main Shaft 7. The embodiment described in the drawing shows a gear reduction system. This transmission allows the proper gear ratios to be configured to optimize the load on the system during charging and recovery cycle.
7) MAIN SHAFT: The Main Shaft 7 bears the load of the Mass 9 via Cable 8 which spools around the shaft. The main shaft rotates one direction in the charging cycle and reverses during energy recovery.
8) CABLE: Cable 8 couples Main Shaft 7 to Mass 9. Rotation of Main Shaft 7 spools Cable 8 changing its length.
9) MASS: Mass 10 is any massive object of greater than 5000 kg.
10) PULLEY: Pulley 10 and Cable 8 comprise a block and tackle system configured to optimize load on the system during charging and recovery phases. Together they couple Electric Motor/Generator Shaft 5 to Mass 9.
11) RACK: The Main Shaft 7 couples to Buoyant Object 12 through Rack 12. Pinion on Main Shaft 7 and Rack 12 form a rack and pinion system such that the rotation of Main shaft 7 causes a lowering or raising of Buoyant Object 12.
12) BUOYANT OBJECT: Buoyant Object 12, which floats in water, capable of displacing 5000 kg of water; is forcibly submerged into water by Rack 11.
13) WATER SURFACE: Depicts the surface of the body of water.
14) SEABED: Depicts the surface of the Earth below the water.
15) DIESEL TRACTOR: Diesel tractor energy source coupled to the system by means of power take-off shaft providing rotational shaft horsepower to charge the system.
16): PTO SHAFT: Direct drive from Diesel engine provides shaft horsepower to the diesel tractor to the Energy Conversion Apparatus.
17) CONVERTER CONTROLLER APPARATUS: Converter Controller Apparatus 20 couples PTO Shaft 16 to Main Shaft 7 via Cable 8 which spools at the output of the Controller Apparatus. The transmission attains the proper gear reduction ratio to couple the load efficiently to the power source. Converter Controller Apparatus 17 contains locking system to maintain Mass 9 in position during storage phase, and to release mass during recovery stage.
18) ELECTRIC GENERATOR: Electric Generator 18 is coupled to Shaft 7 and converts shaft horsepower to electricity during recovery phase. The electric output of Generator 18 is available to feed remote installations such as oil pump pictured.
19) OUTPUT SHAFT
20) HYDRAULIC MOTOR
21) LOCKING MECHANISM
23) HELICOPTER
24) WIND TURBINE

We claim:
1. An energy storage device comprising:
a first shaft with an input end and an output end configured to input rotational kinetic energy to be stored;
a main shaft with an input end and an output end;
a transmission operably connected to the output end of the first shaft and to the input end of the main shaft such that the transmission can change the rotation ratio between the first shaft and the main shaft;
a storage unit comprising an object to be displaced vertically such that potential energy of the object due to gravity can be increased;
a second shaft with an input end and an output end, the input end operably connected to the output end of main shaft;
a pulley wheel rigidly connected to the main shaft such that rotation of the main shaft will rotate the pulley wheel;

a cable, operably connected to the pulley wheel and the object such that the rotation of the pulley corresponds to the vertical motion of the object;

wherein the potential energy of the object is increased by one of (1) the input end of the first shaft operably connected to the power take-off shaft of a diesel tractor such that the diesel tractor can rotate the first shaft and (2) a heavy-lift helicopter operably connected to the object such that the heavy lift helicopter can lift and reset the object.

\* \* \* \* \*